(12) United States Patent
Zhou et al.

(10) Patent No.: US 11,608,034 B2
(45) Date of Patent: Mar. 21, 2023

(54) VEHICLE CLEANING SYSTEM

(71) Applicant: GM GLOBAL TECHNOLOGY OPERATIONS LLC, Detroit, MI (US)

(72) Inventors: Chen Zhou, Troy, MI (US); Prakash Mohan Peranandam, Troy, MI (US); Jianfeng Wang, Jiangsu (CN)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 798 days.

(21) Appl. No.: 16/433,448

(22) Filed: Jun. 6, 2019

(65) Prior Publication Data

US 2020/0384959 A1 Dec. 10, 2020

(51) Int. Cl.
| | |
|---|---|
| *B60S 3/00* | (2006.01) |
| *G05D 1/02* | (2020.01) |
| *B08B 1/04* | (2006.01) |
| *B08B 5/04* | (2006.01) |
| *B08B 3/04* | (2006.01) |

(52) U.S. Cl.
CPC ............... *B60S 3/008* (2013.01); *B08B 1/04* (2013.01); *B08B 3/04* (2013.01); *B08B 5/04* (2013.01); *G05D 1/0212* (2013.01)

(58) Field of Classification Search
None
See application file for complete search history.

(56) References Cited

U.S. PATENT DOCUMENTS

| | | | | |
|---|---|---|---|---|
| 8,170,405 | B2* | 5/2012 | Harris | A01M 1/205 |
| | | | | 392/386 |
| 9,361,090 | B2* | 6/2016 | Elzein | H04W 4/80 |
| 2006/0068693 | A1* | 3/2006 | Kono | A61B 5/6887 |
| | | | | 454/75 |
| 2010/0017543 | A1* | 1/2010 | Preston | H04L 41/00 |
| | | | | 710/16 |

FOREIGN PATENT DOCUMENTS

DE 102016215525 A1 * 2/2018 ............. B08B 1/002

OTHER PUBLICATIONS

Google Patents translation of DE 102016215525 to Strasdat et al., retrieved from https://patents.google.com/patent/DE102016215525A1/en?oq=DE+102016215525+A1 on Aug. 12, 2022 (Year: 2022).*

* cited by examiner

*Primary Examiner* — Eric W Golightly
(74) *Attorney, Agent, or Firm* — Cantor Colburn LLP (57) ABSTRACT

A vehicle cleaning system for cleaning a vehicle including a processor and a memory including computer-executable instructions that, when executed by the processor, cause the processor to perform operations. The operations include determining that a passenger compartment of the vehicle requires cleaning and identifying a type of cleaning required. The operations also include that at least one of a fragrance system, a dry particulate removal system, and a wet particulate removal system is activated in response to the type of cleaning required.

20 Claims, 7 Drawing Sheets

VEHICLE CLEANING SYSTEM

INTRODUCTION

The subject disclosure relates to vehicles, and more particularly relates to methods and systems for cleaning a vehicle.

Conventionally, cleaning a vehicle has often been a labor intensive arduous task that requires humans to carry out the vehicle cleaning by hand.

SUMMARY

In one exemplary embodiment, a vehicle cleaning system for cleaning a vehicle is provided. The controller includes a processor and a memory including computer-executable instructions that, when executed by the processor, cause the processor to perform operations. The operations include determining that a passenger compartment of the vehicle requires cleaning and identifying a type of cleaning required. The operations also include that at least one of a fragrance system, a dry particulate removal system, and a wet particulate removal system is activated in response to the type of cleaning required.

In addition to one or more of the features described herein, or as an alternative, further embodiments may include that the operations further include receiving a cleanliness report from a passenger device indicating that the passenger compartment of the vehicle requires cleaning.

In addition to one or more of the features described herein, or as an alternative, further embodiments may include the operations further include detecting a cleanliness of the interior of the vehicle using a vehicle cleanliness monitoring sensor. The vehicle cleanliness monitoring sensor is configured to detect the cleanliness using at least one of odor detection and image recognition.

In addition to one or more of the features described herein, or as an alternative, further embodiments may include that the operations further include that the vehicle is autonomously driven to a cleaning solution tank and a sprinkler of the wet particulate removal system is fluidly connected to the cleaning solution tank.

In addition to one or more of the features described herein, or as an alternative, further embodiments may include that the operations further include that the sprinkler is activated to spray a cleaning solution from the cleaning solution tank into the passenger compartment when the wet particulate removal system is activated.

In addition to one or more of the features described herein, or as an alternative, further embodiments may include that the operations further include prior to activating the sprinkler, that at least one of a vacuum inlet port and a vent for a heating, ventilation, and air conditioning system of the vehicle is closed. The vacuum inlet port and vent are fluidly connected to the passenger compartment.

In addition to one or more of the features described herein, or as an alternative, further embodiments may include that the operations further include that the vacuum inlet port is opened when the sprinkler has finished activating.

In addition to one or more of the features described herein, or as an alternative, further embodiments may include that the operations further include that a vacuum pump of the dry particulate removal system is activated when the vacuum inlet port has opened, wherein the vacuum pump is configured to apply a suction to the vacuum inlet port to remove particulates and the cleaning solution from the passenger compartment.

In addition to one or more of the features described herein, or as an alternative, further embodiments may include that the operations further include that the vent for a heating, ventilation, and air conditioning system of the vehicle is opened when the sprinkler has finished activating and the air-conditioning system is activated when the vent has opened.

In addition to one or more of the features described herein, or as an alternative, further embodiments may include that the operations further include that a window of the vehicle is lowered when the sprinkler has finished activating.

In addition to one or more of the features described herein, or as an alternative, further embodiments may include that the operations further include that a fragrance emitting device is activated to emit a selected fragrance into the passenger compartment when the fragrance system is activated.

In addition to one or more of the features described herein, or as an alternative, further embodiments may include that the operations further include that a fragrance emitting device is activated to emit a selected fragrance into the passenger compartment when the sprinkler has finished activating.

In addition to one or more of the features described herein, or as an alternative, further embodiments may include that the operations further include that a vacuum pump of the dry particulate removal system is activated when the dry particulate removal system is activated. The dry particulate system further includes a vacuum inlet port fluidly connected to the passenger compartment. The vacuum pump is configured to apply a suction to the vacuum inlet port to remove particulates from the passenger compartment.

In addition to one or more of the features described herein, or as an alternative, further embodiments may include that the operations further include that an agitation brush of the dry particulate removal system is activated when the dry particulate removal system is activated. The agitation brush being configured to agitate a surface of the passenger compartment to remove particulates on the surface.

In addition to one or more of the features described herein, or as an alternative, further embodiments may include that the operations further include that an air jet of the dry particulate removal system is activated when the dry particulate removal system is activated. The air jet being configured to direct a concentrated jet of air at various components within the passenger compartment.

In addition to one or more of the features described herein, or as an alternative, further embodiments may include that the operations further include that a passenger preference is received from a passenger device or a remote database, indicating that the passenger desires the cleaning of the vehicle prior to the passenger entering the vehicle.

In one exemplary embodiment, a vehicle cleaning system for cleaning a vehicle is provided. The vehicle cleaning system including a fragrance system configured to emit a selected fragrance into a passenger compartment of the vehicle and a dry particulate removal system configured to remove particulate from the passenger compartment. The vehicle cleaning system also includes a wet particulate removal system configured to wash the passenger compartment and a controller configured to activate at least one of the fragrance system, the dry particulate removal system, and the wet particulate removal system.

In addition to one or more of the features described herein, or as an alternative, further embodiments may include that the dry particulate removal system further includes an agitation brush configured to agitate a surface of the passenger compartment to remove particulates on the surface and a vacuum inlet port fluidly connect to the passenger compartment. The dry particulate removal system further include a vacuum pump fluidly connected to the vacuum inlet port. The vacuum pump being configured to apply a suction to the vacuum inlet port.

In addition to one or more of the features described herein, or as an alternative, further embodiments may include that the dry particulate removal system further includes an air jet configured to direct a concentrated jet of air at various components within the passenger compartment.

In addition to one or more of the features described herein, or as an alternative, further embodiments may include that the wet particulate removal system further includes a sprinkler configured to spray a cleaning solution into the passenger compartment.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, exemplary embodiments may employ various integrated circuit components (e.g., memory elements, digital signal processing elements, logic elements, look-up tables, or the like), which may carry out a variety of functions under the control of one or more microprocessors or other control devices. In addition, those skilled in the art will appreciate that exemplary embodiments may be practiced in conjunction with any number of control systems, and that the vehicle systems described herein are merely exemplary embodiments.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in various embodiments.

In the near future autonomous vehicles may be able to pick up passengers and deliver passengers to a destination without the input of a human driver. Autonomous vehicles may be capable of operating for extended periods of time without any input or oversight from a human driver. Additionally, shared vehicles and self-service rental vehicles may operate for long period of time without an oversight by a human owner of the vehicle.

Conventionally, cleaning a vehicle has often been a labor intensive arduous task that requires humans to not only carry out the vehicle cleaning by hand but also identify when the vehicle needs cleaning.

Embodiments disclosed herein seek to provide methods and systems for monitoring and maintaining the cleanliness of vehicles.

Figure 1:
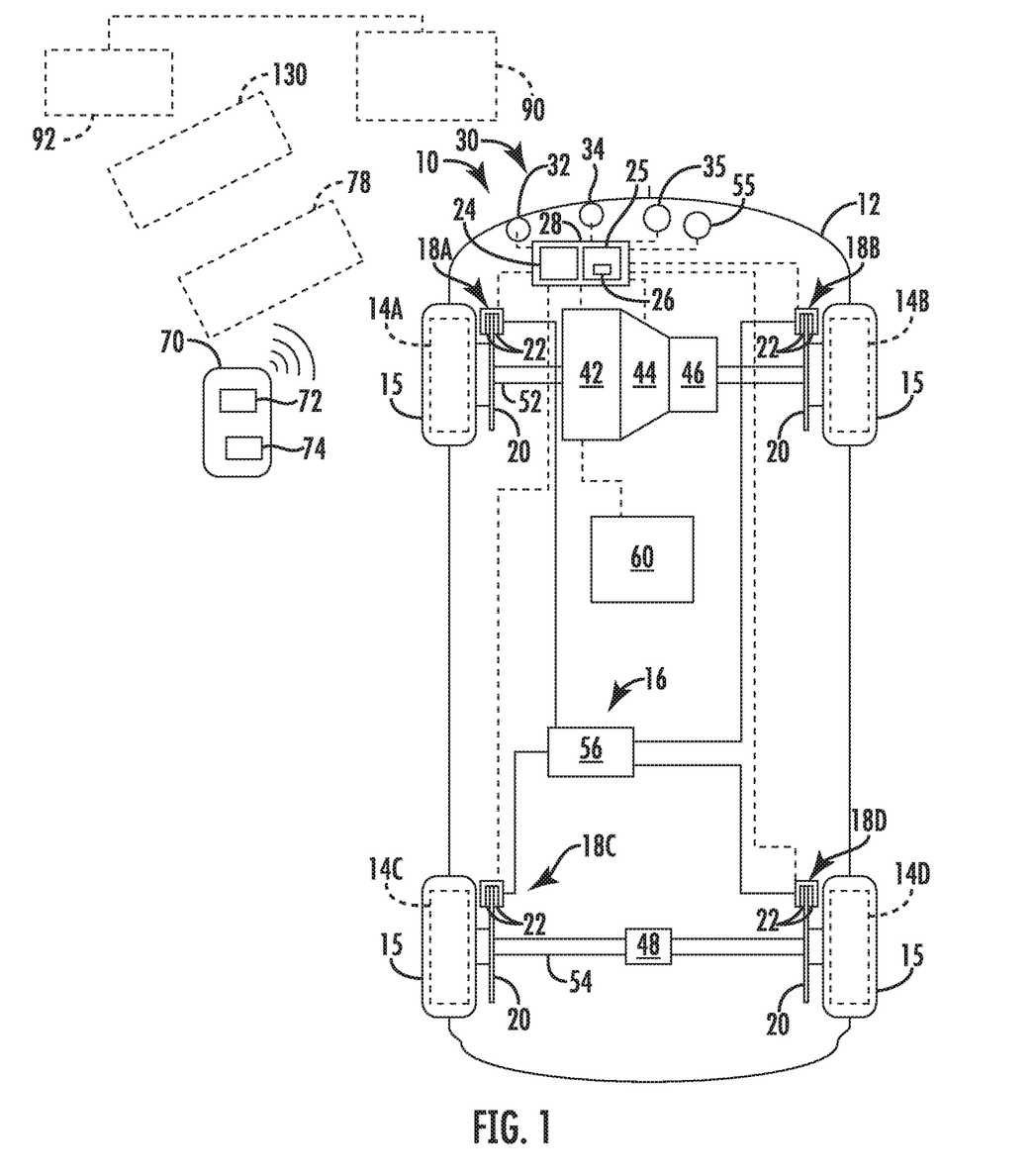
FIG. 1 is an illustration of a vehicle, according to an embodiment of the present disclosure.

Referring now to FIG. 1, a vehicle 10 has a vehicle body 12 that is operatively connected to rotatable wheels 14A, 14B, 14C, 14D for moving the vehicle body 12 when propelled by a propulsive motor 42. In an embodiment, the vehicle may be a car but it is understood that the embodiments disclosed herein are not limited to cars and may be applicable to other vehicles including but not limited to boats, airplanes, helicopters, buses, trains, tunnel pods, or any other vehicle known to one of skill in the art. In an embodiment, the propulsive motor 42 is an electric motor but it is understood that the embodiments disclosed herein are not limited to a vehicle 10 propelled by an electric motor, thus the embodiments disclosed herein may also be applicable to propulsive motors including but not limited to vehicles propelled entirely and/or partially by an internal combustion engine, or any other propulsive motor 42 known to one of skill in the art.

The vehicle 10 may also include an energy storage device 60 operably connected to the propulsive motor 42. The energy storage device 60 maybe configured to provide electrical energy to the propulsive motor 42. The energy storage device 60 may include a battery system (e.g., a battery or bank of batteries), fuel cells, flow battery, and others devices capable of storing and outputting electric energy to the propulsive motor 42. The vehicle 10 may or may not include a transmission 44 operably connecting the propulsive motor 42 to at least one of the front wheel axle 52 and the rear wheel axle 54. In one non-limiting example, the vehicle 10 is a front wheel-drive vehicle. A front differential 46 may operatively connect the front wheels 14A, 14B, and a rear differential 48 operatively connects the rear wheels 14C, 14D via half shafts as is known. Tires 15 are shown mounted on the wheels 14A-14D. The vehicle 10 includes a braking system 16 that is configured to stop rotation of the wheels 14A-14D. The braking system 16 includes a fluid pressure source 56 in communication with respective braking mechanisms 18A, 18B, 18C, 18D operatively connected with each respective wheel 14A-14D. The braking mechanisms 18A-18D each have a brake rotor 20 rotatable with the respective wheel 14A-14D.

In an embodiment, the vehicle 10 may be semi-autonomous or fully autonomous but it is understood that the embodiments disclosed herein are not limited to semi-autonomous or fully autonomous vehicles and may be applicable to other non-autonomous vehicles. The vehicle may include an autonomous vehicle driving system 30 capable of driving the vehicle semi-autonomously and/or fully autonomously. The autonomous vehicle driving system 30 on the vehicle 10 includes various vehicle sensors including but not limited to a vehicle location sensor 55, a vehicle collision avoidance sensor 35, a vehicle systems monitoring sensor 34, and a vehicle cleanliness monitoring sensor 32.

Although only one vehicle location sensor 55 is depicted many more vehicle location sensors 55 may be included in the autonomous vehicle driving system 30. The vehicle location sensor 55 may be configured to determine a location of the vehicle 10. The location of the vehicle 10 may include a geographic location, such as, for example, a global positioning system (GPS) location of the vehicle 10. The location of the vehicle 10 may also include a lane-location of the vehicle 10, such as, for example, the location of the vehicle 10 within the driving lane or a parking spot.

Although only one vehicle collision avoidance sensor 35 is depicted many more vehicle collision avoidance sensors 35 may be included in the autonomous vehicle driving system 30. The vehicle collision avoidance sensor 35 may be configured to determine objects surrounding the vehicle 10 that may pose a risk of collision, such as, for example, buildings, walls, curbs, other vehicles, guard rails, or any other object that may potentially collide with the vehicle 10. The vehicle collision avoidance sensor 35 may be configured to determine the object and a distance between the object and the vehicle 10. The vehicle collision avoidance sensor 35 may utilize various sensing methods including but not limited to, radio detecting and ranging (RADAR), light detecting and ranging (LIDAR), image recognition through a camera, or any other sensing method known to one of skill in the art.

Although only one vehicle systems monitoring sensor 34 is depicted many more vehicle systems monitoring sensors 34 may be included in the autonomous vehicle driving system 30. The vehicle systems monitoring sensor 34 may be configured to monitor various vehicle systems including but not limited to the propulsive motor 42 and the braking system 16. The input from the vehicle systems monitoring sensor 34 may include, but is not limited to, propulsion motor speeds, energy storage device parameters, wheel speeds, vehicle speed, longitudinal acceleration, dynamic brake proportioning, brake apply, vehicle grade, brake temperature (brake pad, or brake fluid).

Although only one vehicle cleanliness monitoring sensor 32 is depicted many more vehicle cleanliness monitoring sensors may be included in the (semi-) autonomous vehicle driving system 30. The vehicle cleanliness monitoring sensor 32 may be configured to detect a cleanliness of the interior and/or exterior of the vehicle 10. The vehicle cleanliness monitoring sensor 32 may utilize various sensing methods to determine the cleanliness of the vehicle including, but not limited to, odor detection sensors (e.g., sniffers), image recognitions system (e.g., cameras), and/or a cleanliness report 78. The cleanliness report 78 may be a manual input received from a passenger device 70 or vehicle cleanliness monitoring sensor 32 in vehicle 10, indicating the cleanliness the vehicle 10 in the opinion of the passenger.

The passenger device 70 may be a computing device either located in the vehicle 10 or carried by the passenger. The passenger device 70 may be a computing device including, but are not limited to, a laptop computer, a tablet computer, a mobile device (e.g., a cell phone, smartphone, smart wearable device, etc.) or similar computing device known to one of skill in the art. The passenger device 70 includes a computing application 72 and a data input device 74. The computing application 72 may be software installed on the passenger device 70 that allows entry of a cleanliness report 78 by the passenger via an input device 74. The cleanliness report 78 may be transmitted to a controller 28 of the vehicle 10. The input device 74 may be a data entry device, such as, for example, a key board, a touch screen, a computer mouse, a scroll wheel, a microphone, or any other similar data entry device known to one of skill in the art. In some embodiments, the passenger device 70 may communicate with controller 28 of the vehicle 10 via a computing network. In some embodiments, the passenger device 70 may communicate directly with controller 28 of the vehicle 10. For instance, the passenger device 70 may be capable of communicating directly with the controller 28 via a short-range communication protocol such as, for example, Bluetooth.

A passenger may also use the computing application 72 on the passenger device 70 to set-up passenger preferences 130 that may depict how the passenger likes the vehicle 10 to be cleaned prior to their entry and during their ride. For example, the passenger may desire that the vehicle 10 be vacuumed, washed, and a fragrance added prior to the passenger's entry and/or during the passenger's ride. The passenger preferences 130 may be stored in a remote database 90 and communicated to the controller 28. The passenger preferences 130 may include but are not limited to passenger fragrance preferences 230 shown in FIG. 2, passenger particulate preferences 330 shown in FIG. 3, and passenger wash preferences 430 shown in FIG. 4. Cleaning schedules 92 may also be stored in the remote database 90. The cleaning schedules 92 may depict how and when the vehicle 10 is scheduled to be cleaned.

The autonomous vehicle driving system 30 also includes a controller 28 that is in electronic communication with the vehicle location sensor 55, the vehicle collision avoidance sensor 35, the vehicle systems monitoring sensor 34, and the vehicle cleanliness monitoring sensor 32. The controller 28 receives input signals from the vehicle location sensor 55, the vehicle collision avoidance sensor 35, the vehicle systems monitoring sensor 34, and the vehicle cleanliness monitoring sensor 32, so that a processor 24 of the controller 28 can carry out the stored algorithm(s) 26 for semi-autonomous and/or fully autonomous driving.

It should be appreciated that the electronic controller 28 may be configured as a single or distributed control device that is electrically connected to or otherwise placed in hard-wired or wireless communication with the propulsive motor 42, the transmission 44, the braking system 16, and various vehicle components, including sensors, for transmitting and receiving electrical signals for proper execution of the algorithm 26.

The electronic controller 28 includes one or more control modules, with one or more processors 24 and tangible, non-transitory memory 25 (e.g., read-only memory (ROM)) whether optical, magnetic, flash, or otherwise. The electronic controller 28 may also include sufficient amounts of random access memory (RAM), electrically-erasable programmable read-only memory (EEPROM), and the like, as well as a high-speed clock, analog-to-digital (A/D) and digital-to-analog (D/A) circuitry, and input/output circuitry and devices (I/O), as well as appropriate signal conditioning and buffer circuitry.

The electronic controller 28 can be a host machine or distributed system (e.g., a computer such as a digital computer or microcomputer) acting as a vehicle control module, and/or as a proportional-integral-derivative (PID) controller device having a processor, and, as the memory, tangible, non-transitory computer-readable memory such as read-only memory (ROM) or flash memory. Therefore, the controller 28 can include all software, hardware, memory, algorithms, connections, sensors, etc., necessary to monitor the vehicle 10 and control the autonomous vehicle driving system 30. As such, one or more control methods executed by the controller 28 can be embodied as software or firmware associated with the controller. It is to be appreciated that the controller can also include any device capable of analyzing data from various sensors, comparing data, and making decisions required semi-autonomous or fully autonomous driving. Moreover, the electronic controller 28 can be configured in different embodiments to include a brake controller, a powertrain controller, and other controllers onboard or offboard the vehicle 10.

Figure 2:
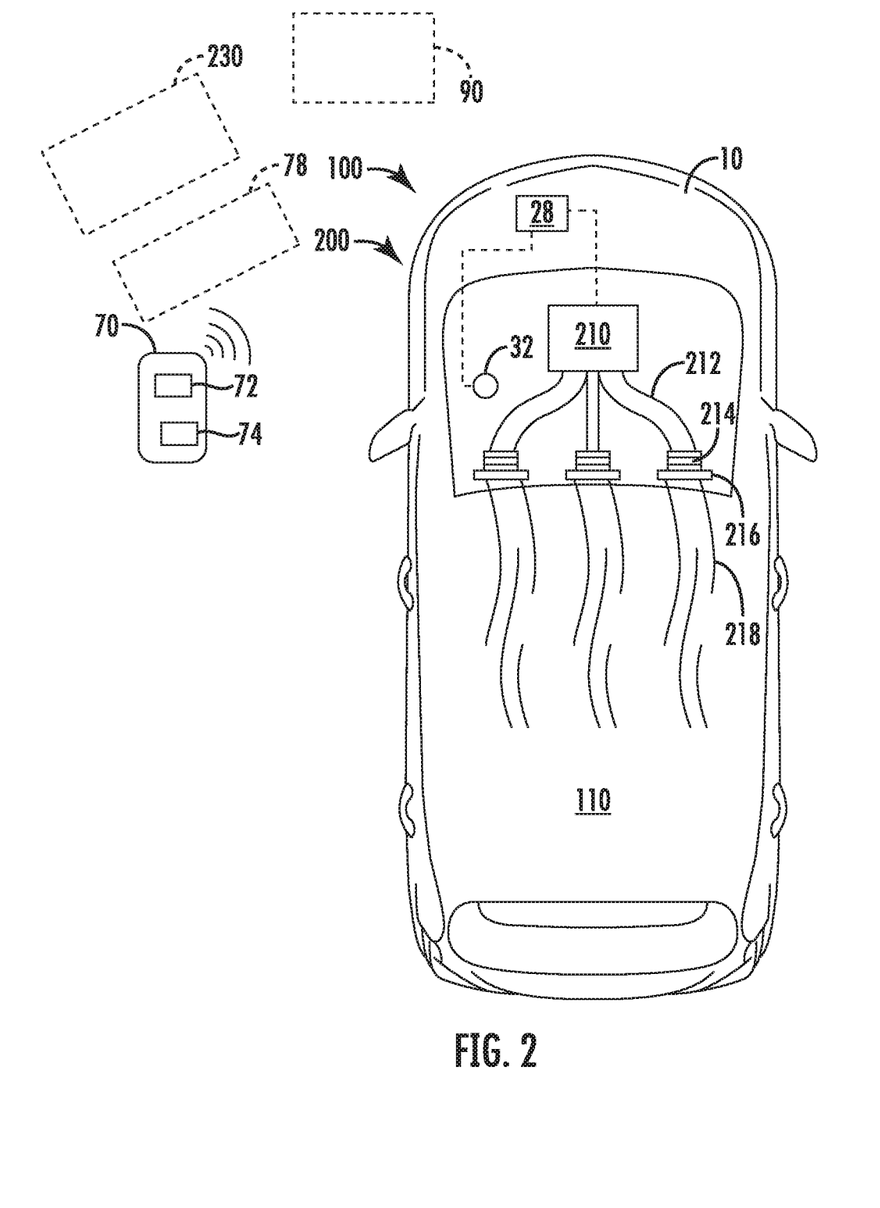
FIG. 2 is an illustration of a fragrance system of the vehicle of FIG. 1, according to an embodiment of the present disclosure.
Figure 3:
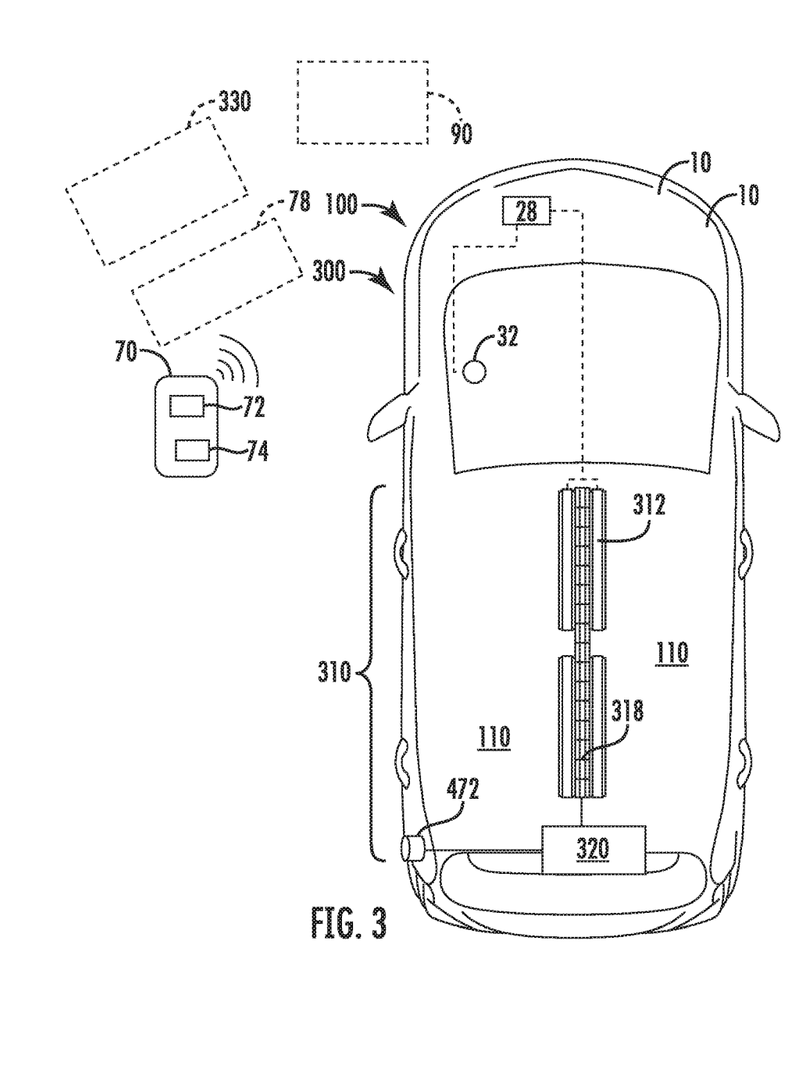
FIGS. 3, 3A 3B, and 3C is an illustration of a dry particulate removal system of the vehicle of FIG. 1, according to an embodiment of the present disclosure.

Referring to FIG. 2, with continued reference to FIG. 1, a top view of a fragrance system 200 for a vehicle cleaning system 100 of the vehicle 10 is illustrated, according to an embodiment of the present disclosure. The fragrance system 200 is configured to emit a selected fragrance 218 into the passenger compartment 110 of the vehicle 10. The fragrance system 200 may include a fragrance emitting device 216 in electronic communication with the controller 28 of the vehicle 10. The fragrance emitting device 216 may be configured to emit the selected fragrance 218 into an interior of the passenger compartment 110 of the vehicle 10 when commanded by the controller 28. The controller 28 may command the fragrance emitting device 216 to emit the selected fragrance 218 when an odor is detected by the vehicle cleanliness monitoring sensor 32 within the passenger compartment 110. For example, the cleanliness monitoring sensor 32 may be a sniffing device, as previously discussed herein. The controller 28 may command the fragrance emitting device 216 to emit the selected fragrance 218 intermittently based upon a selected time period or a selected number of passengers in the passenger compartment 110. In one example, the controller 28 may command the fragrance emitting device 216 to emit the selected fragrance 218 about every hour. In another example, the controller 28 may command the fragrance emitting device 216 to emit the selected fragrance 218 after five passengers have entered the passenger compartment 110. The controller 28 may activate the fragrance system 200 in response to a cleanliness report 78 received from the passenger. For example, the passenger might have stated in the cleanliness report 78 that the passenger compartment 110 had an odor and needed some fragrance added to remove the odor.

The fragrance emitting device 216 may include a plurality of different fragrances and a specific fragrance may be selected as the selected fragrance 218 to emit into the passenger compartment 110 in response to a passenger fragrance preference 230 and/or the odor detected within the passenger compartment 110. In one example, some fragrances may be better at masking or removing certain odors. In another example, the passenger fragrance preference 230 for the selected fragrance 218 may be communicated to the controller 28 and the controller may command the fragrance emitting device 216 to emit the selected fragrance preferred by the passenger prior to the passenger entering the passenger compartment 110 and/or while the passenger is within the passenger compartment. The passenger fragrance preference 230 may be stored on or entered into the passenger device 70 and communicated to the controller 28 when the passenger requests the vehicle 10 to pick up the passenger. The passenger fragrance preference 230 may be also stored on the remote database 90.

The fragrance emitting device 216 may be operably connected to a heating, ventilation, and air conditioning (HVAC) system 210 of the vehicle 10. The HVAC system of the vehicle may distribute air (both conditioned and unconditioned) through a duct system 212 to vents 214 that are fluidly connected to the passenger compartment 110. The HVAC system may provide air through the vents 214 to help distribute the selected fragrance 218 emitted from the fragrance emitting device 216. The fragrance emitting device may be located proximate the vents 214, as shown in FIG. 2.

Figure 3A:
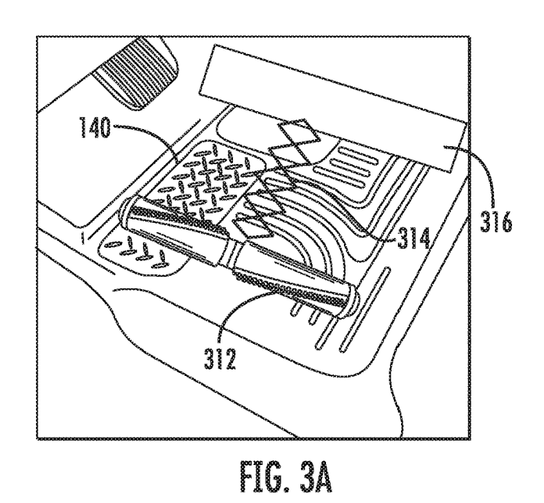

Referring to FIGS. 3, 3A, 3B, and 3C, with continued reference to FIG. 1, a top view of a dry particulate removal system 300 for the vehicle cleaning system 100 of the vehicle 10 is illustrated, according to an embodiment of the present disclosure. The dry particulate removal system 300 is configured to remove particulates from the passenger compartment 110 of the vehicle 10. Particulates may include any debris that may be tracked into a vehicle, such as, for example, dirt, debris, road salt, dust, pet fur, grass, mud, snow, water, or hair. The dry particulate removal system 300 may also be configured to remove a cleaning solution 462 from the passenger compartment 110 that is utilized by the wet particulate removal system 400 (see FIG. 4). The dry particulate removal system 300 may include a vacuum system 310 in electronic communication with the controller 28. The vacuum system 310 may be configured to remove particulate from various surfaces of the passenger compartment 110 via surface agitation and/or suction. The various surfaces may include, but are not limited to, the floor 140 of the passenger compartment 110, a dashboard of the passenger compartment or any other surface of the passenger compartment. The vacuum system 310 may include agitation brushes 312 configured to rotate and agitate a surface of the passenger compartment 110 to remove particulates. As shown in FIG. 3A, the agitation brushes 312 may be stored in a housing 316 when not and use and then extend away from the housing 316 via a control arm 314 when in use. The control arm 314 may move the agitation brush 312 across the surface during operation. A vacuum pump 320 is configured to apply a suction to a vacuum inlet port 318 to remove particulates from the passenger compartment 110. The vacuum pump 320 may also apply a suction to at least one of the housing 316 and the agitation brushes 312 in order to capture particulates and ingest the particulates through the vacuum inlet port 318. The vacuum inlet port 318 may be fluidly connected to an outlet 472 to remove particulates from vacuum system 310 and the vehicle 10. The vacuum pump 320 provides suction to move particulates from the vacuum inlet port 318 to the outlet 472.

Figure 3B:
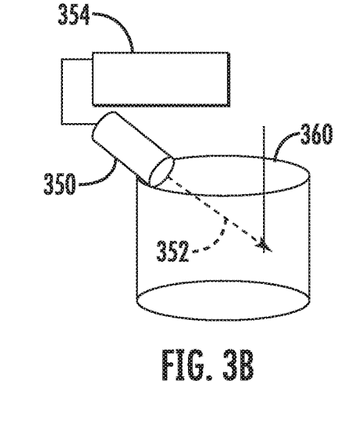
Figure 3C:
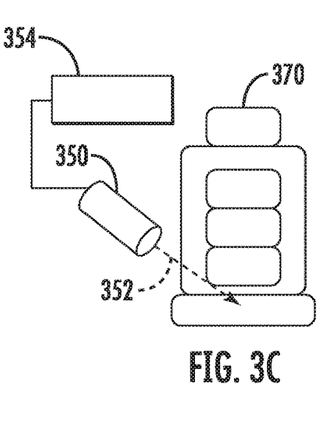

The dry particulate removal system 300 may also include one or more air jets 350 in electronic communication with the controller 28 of the vehicle 10. The air jets 350 may be fluidly connected to an air pump 354 that provides compressed air to the air jet. The air jets 350 are configured to direct a concentrated jet of air 352 at various components within the passenger compartment 110 that may tend to accumulate particulates. In the example shown in FIG. 3B, the air jet 350 may be configured to direct the concentrated jet of air 352 at a cup holder 360 (e.g., or other storage component). In the example shown in FIG. 3C, the air jet 350 may be configured to direct a concentrated jet of air 352 at a seat 370 within the passenger compartment 110 of the vehicle 10. The air jet 350 may be articulated to direct a jet of air 352 in multiple directions.

The air jets 350 and/or the vacuum system 310 may be activated when commanded by the controller 28. The controller 28 may command the air jets 350 and/or the vacuum system 310 to activate when an excessive amount of particulates are detected within the passenger compartment 110 by the cleanliness monitoring sensor 32. In one example, the cleanliness monitoring sensor 32 may be a camera configured to visually detect particulate within the passenger compartment 110. In another example, the cleanliness monitoring sensor 32 may be a sniffing device that may detect when a concentration of particulates is greater than a selected threshold. The controller 28 also may command the air jets 350 and/or the vacuum system 310 to activate intermittently based upon a selected time period or a selected number of passengers in the passenger compartment 110. In one example, the controller 28 may command the air jets 350 and/or the vacuum system 310 to activate about every hour. In another example, the controller 28 may command the air jets 350 and/or the vacuum system 310 to activate after five passengers have entered the passenger compartment 110.

The controller 28 may command the air jets 350 and/or the vacuum system 310 to activate in response to a passenger particulate preference 330. For example, a passenger may desire that the passenger compartment 110 be vacuumed by the vacuum system 310 and/or air jets 350 activated prior to entry of the passenger. The passenger particulate preference 330 may be communicated to the controller 28 and the controller 28 may command the activation of the air jets 350 and/or the vacuum system 310 prior to the passenger entering the passenger compartment 110 and/or while the passenger is within the passenger compartment. The passenger particulate preference 330 may be stored on or entered into the passenger device 70 and communicated to the controller 28 when the passenger requests the vehicle 10 to pick up the passenger. The passenger particulate preference 330 may also be stored on the remote database 90. The controller 28 may activate the dry particulate removal system 300 in response to a cleanliness report 78 received from the passenger. For example, the passenger might have stated in the cleanliness report 78 that the passenger compartment 110 was dirty and needed a vacuum.

Figure 4:
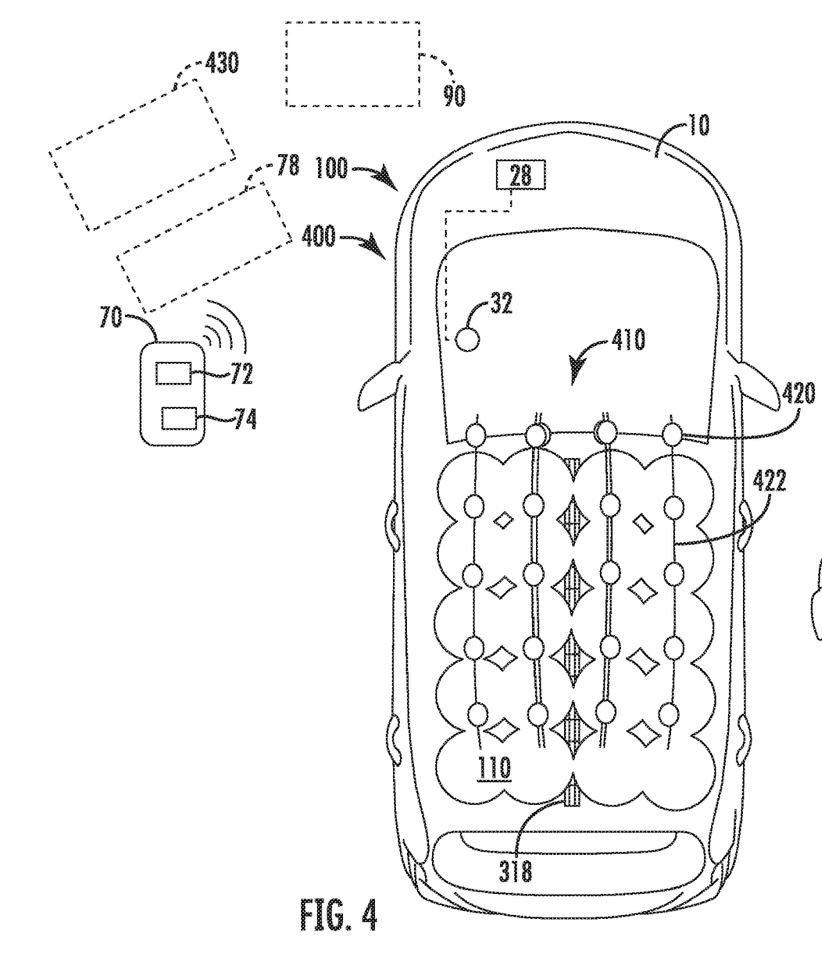
FIGS. 4 and 4A is an illustration of a wet particulate removal system of the vehicle of FIG. 1, according to an embodiment of the present disclosure.
Figure 4A:
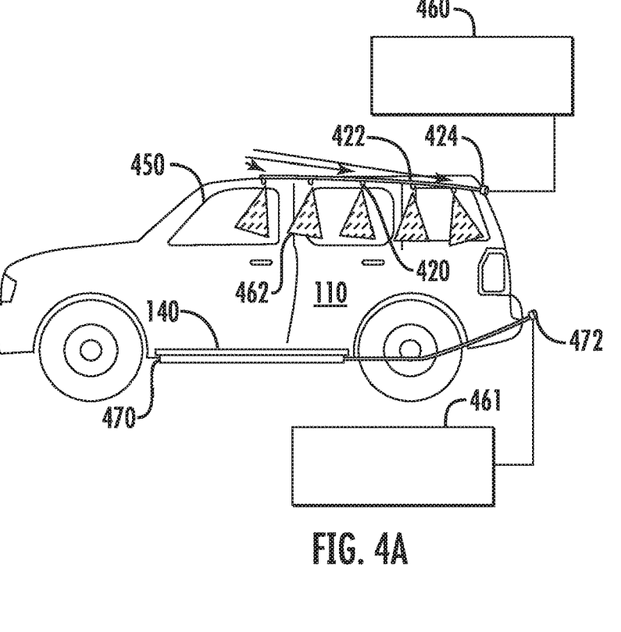

Referring to FIGS. 4 and 4A, with continued reference to FIG. 1, a top view of a wet particulate removal system 400 for the vehicle cleaning system 100 of the vehicle 10 is illustrated, according to an embodiment of the present disclosure. The wet particulate removal system 400 is configured to wash the passenger compartment 110 of the vehicle 10. The wet particulate removal system 400 may include a sprinkler system 410 in electronic communication with the controller 28. The sprinkler system 410 may be configured to remove particulate from various surfaces of the passenger compartment 110 using a cleaning solution 462, such as, for example water and/or soap. The various surfaces may include but are not limited to the floor 140, a dashboard, seats, or any other surface of the passenger compartment 110. The sprinkler system 410 may include sprinklers 420 configured to spray the cleaning solution 462 from a cleaning solution tank 460 into the passenger compartment 110. The sprinklers 420 may be articulated to direct the cleaning solution 462 in multiple different directions within the passenger compartment 110. The sprinklers 420 may be located proximate a roof 450 of the vehicle 10. The sprinklers 420 may be fluidly connected to other sprinklers 420 through a series of tubes 422. The tubes 422 may fluidly connect the sprinklers 420 to an inlet 424 configured to receive the cleaning solution 462 from the cleaning solution tank 460. The inlet 424 may be located on the roof 450 of the vehicle 10 outside of the passenger compartment 110. The wet particulate removal system 400 may also utilize the vacuum inlet ports 318 located on the floor 140. The vacuum inlet ports 318 are configured to collect cleaning solution 462 within the passenger compartment 110 and convey the cleaning solution to an outlet 472 where the cleaning solution 462 may exit the vehicle 10. The outlet 472 may operably connect to a removal system 461 that may include an external vacuum and/or a receptacle to collect particulate and cleaning solution.

The wet particulate removal system 400 may be activated when commanded by the controller 28. The controller 28 may be configured to autonomously drive the vehicle 10 to the cleaning solution tank 460 and fluidly connect the inlet 424 to the cleaning solution tank 460 in order to activate the wet particulate removal system 400. The controller 28 may command the wet particulate removal system 400 to activate when an excessive amount of particulate is detected within the passenger compartment 110 by the cleanliness monitoring sensor 32. In one example, the cleanliness monitoring sensor 32 may be a camera configured to visually detect particulates within the passenger compartment 110. In another example, the cleanliness monitoring sensor 32 may be a sniffing device that may detect when a concentration of particulates within the passenger compartment 110 is greater than a selected threshold. The controller 28 also may command the wet particulate removal system 400 to activate intermittently based upon a selected time period or a selected number of passengers in the passenger compartment 110. In one example, the controller 28 may command the wet particulate removal system 400 to activate about once a day. In another example, the controller 28 may command the wet particulate removal system 400 to activate after 10 passengers have travelled in or occupied the passenger compartment 110.

The controller 28 may command the wet particulate removal system 400 to activate in response to a passenger wash preference 430 of a passenger that will be entering the vehicle 10. For example, a passenger may desire that the passenger compartment 110 be washed with the cleaning solution 462 prior to entry of the passenger. The passenger wash preference 430 may be communicated to the controller 28 and the controller may command the activation of the wet particulate removal system 400 prior to the passenger entering the passenger compartment 110. The passenger wash preference 430 may be stored on or entered into the passenger device 70 and communicated to the controller 28 when the passenger requests the vehicle 10 to pick up the passenger. The passenger wash preference 430 may be stored on the remote database 90. The controller 28 may activate the wet particulate removal system 400 in response to a cleanliness report 78 received from the passenger. For example, the passenger might have stated in the cleanliness report 78 that the passenger compartment 110 was dirty and needed a wash.

Figure 5:
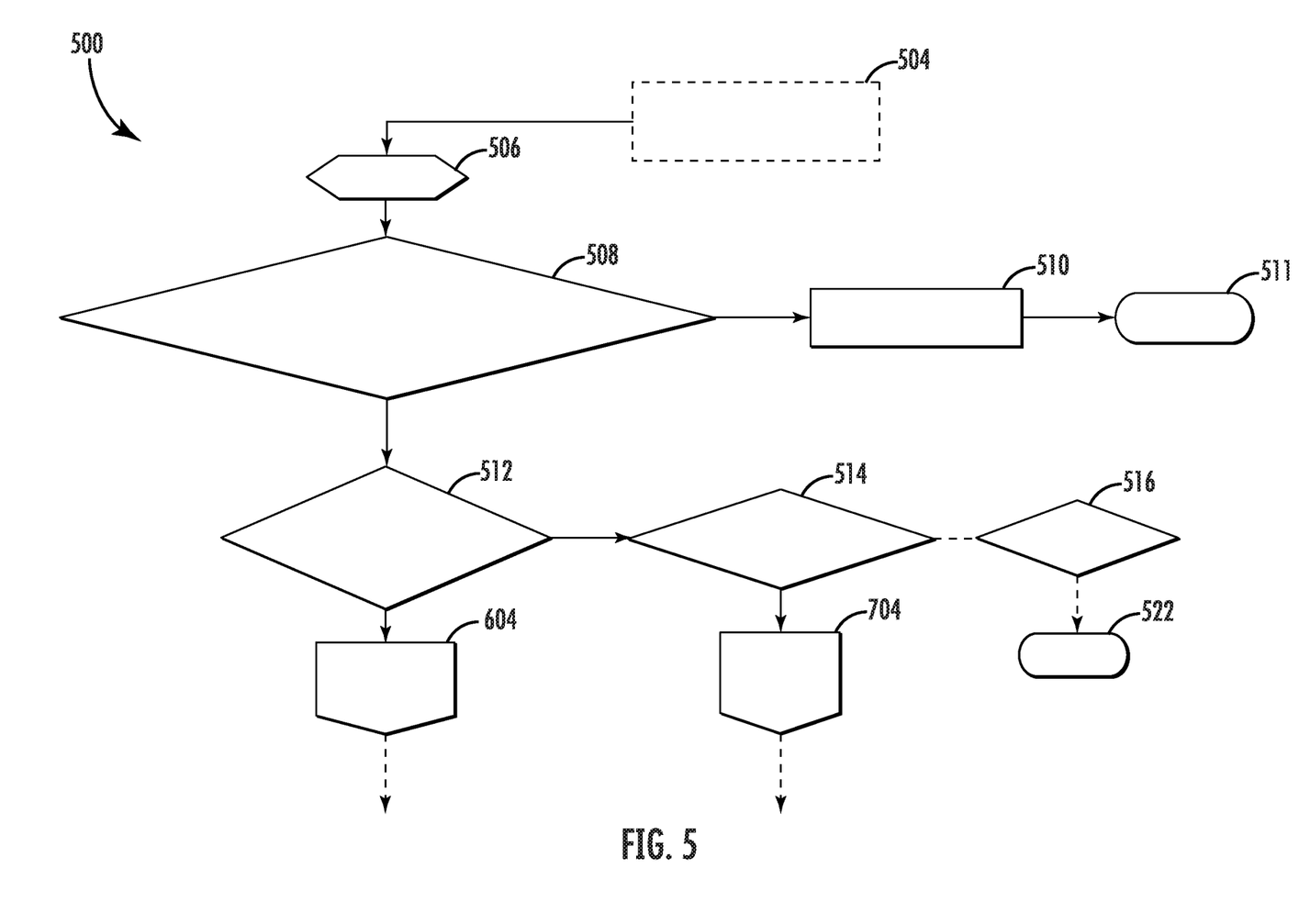
FIG. 5 is a flow diagram illustrating a method of operating a vehicle cleaning system for the vehicle of FIG. 1, according to an embodiment of the present disclosure.

Referring to FIG. 5, with continued reference to FIGS. 1-4A, a method 500 of operating the vehicle cleaning system 100 is illustrated, in accordance with an embodiment of the present disclosure. The method 500 may be performed by the controller 28. The vehicle cleaning system 100 may include at least one of the fragrance system 200, the dry particulate removal system 300, and the wet particulate removal system 400. The vehicle cleaning system 100 may use the fragrance system 200, the dry particulate removal system 300, and the wet particulate removal system 400 in any order or combination. For instance, the vehicle cleaning system may activate the dry particulate removal system 300 first, then activate the wet particulate removal system 400 second, and then finish by activating the fragrance system 200.

The method 500 may start at block 506 where input data may be collected at block 504 from the application 72 on the passenger device 70 and/or the remote database 90. The input data may include the passenger preferences 130, cleanliness reports 78, and cleaning schedules 92 for the vehicle 10.

At block 508, the method 500 may check whether a cleaning mode is on (i.e., the vehicle 10 is scheduled to be cleaned) or the passenger compartment 110 has been determined to be not-clean or soiled in response to a cleanliness report 78 or the cleanliness monitoring sensor 32. At block 508, if the cleaning mode is not on or the vehicle 10 has not been determined to be not-clean then the method 500 moves to block 510 to inform an operator/owner that the method 500 will end and the method 500 stops at block 511. At block 508, if the cleaning mode is on or the vehicle 10 has been determined to be not-clean or soiled then the method 500 will move to block 512.

Figure 6:
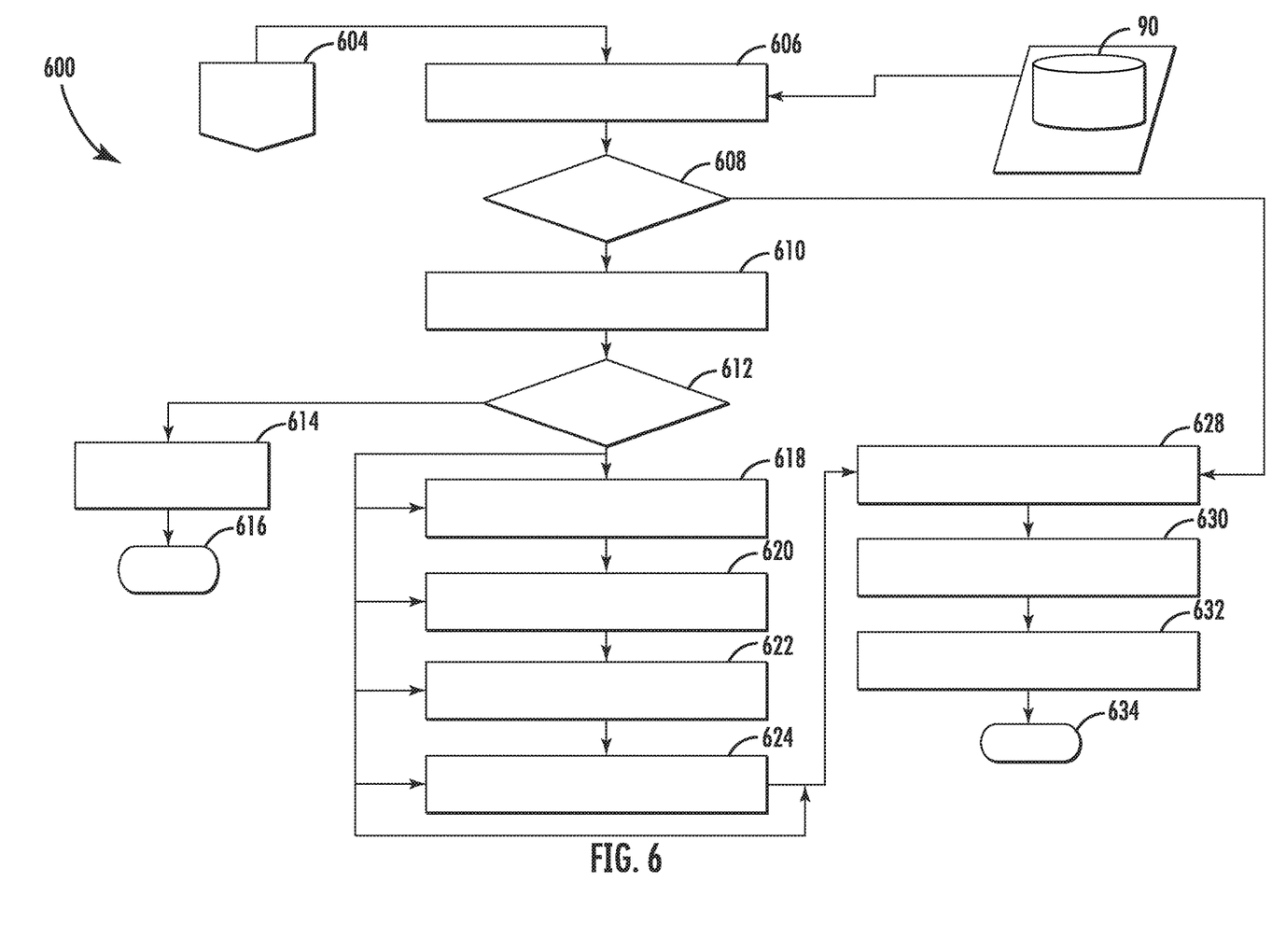
FIG. 6 is a flow diagram illustrating a method of operating a fragrance system and a dry particulate removal system for the vehicle of FIG. 1, according to an embodiment of the present disclosure.

At block 512, it is determined whether a dry particulate removal using the dry particulate removal system 300 is required and/or a fragrance using the fragrance system 200 is required. At block 512, if it is determined that a dry particulate removal using the dry particulate removal system 300 is required and/or a fragrance using the fragrance system 200 is required then a method 600, as shown in FIG. 6, may be performed starting at block 604 where the method 600 is initiated. At block 512, if it is determined that a dry particulate removal using the dry particulate removal system 300 is not required and a fragrance using the fragrance system 200 not is required then the method 500 moves on to block 514.

Figure 7:
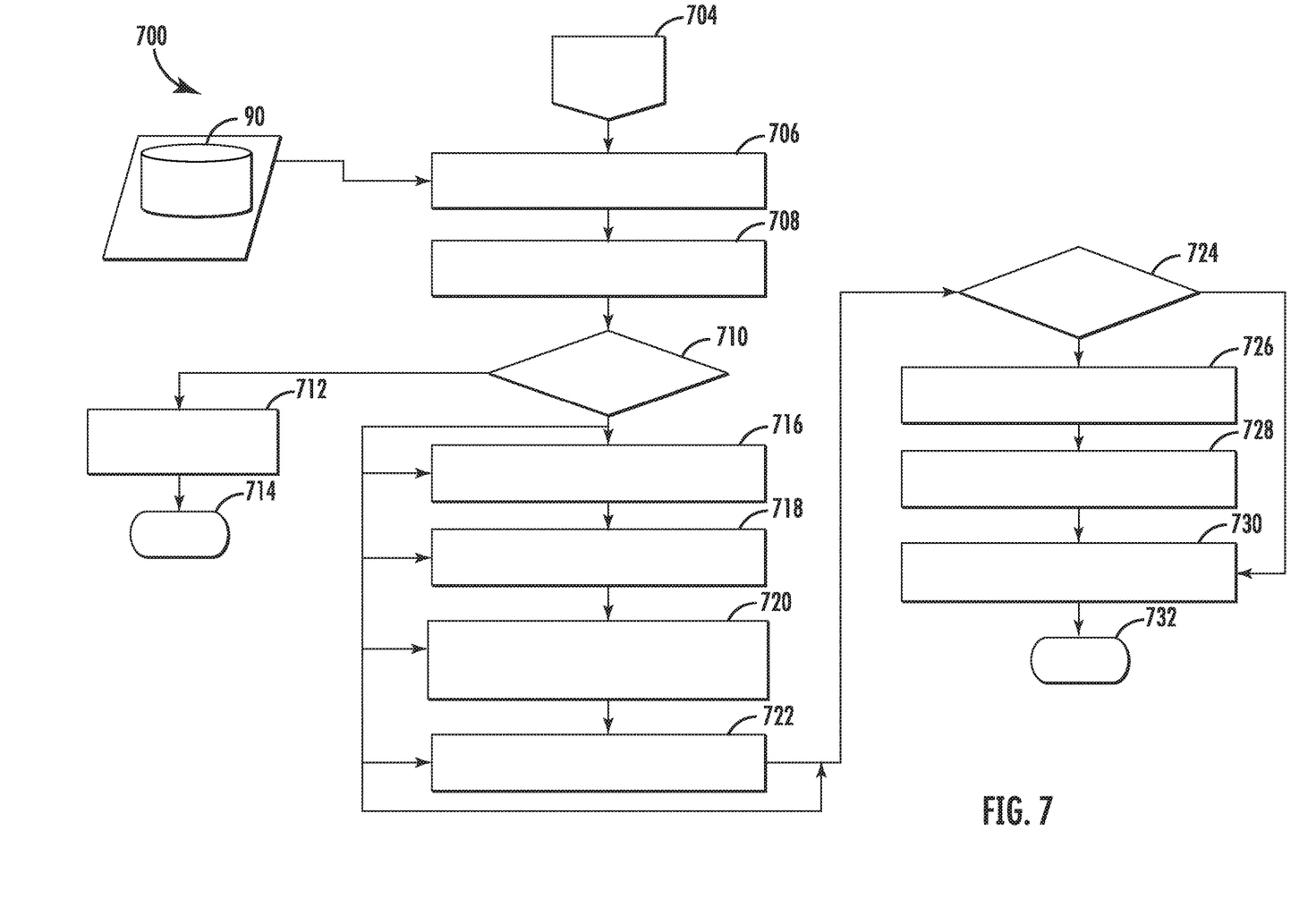
FIG. 7 is a flow diagram illustrating a method of operating a fragrance system and a wet particulate removal system for the vehicle of FIG. 1, according to an embodiment of the present disclosure.

At block 514, it is determined whether a wash using the wet particulate removal system 400 is required. At block 514, if it is determined that a wash using the wet particulate removal system 400 is required then a method 700, as shown in FIG. 7, may be performed starting at block 704 where the method 700 is initiated. At block 514, if it is determined that a wash using the wet particulate removal system 400 is not required then the method 500 will move to block 516 where other services may be performed and then the method 500 may end at block 522. For example, the other services may be a dry particulate removal without a fragrance 218 or simply opening vents, windows, and/or doors of the vehicle 10 for fresh air.

While the above description has described the flow process of method 500 in a particular order, it should be appreciated that unless otherwise specifically required in the attached claims that the ordering of the steps may be varied.

Referring to FIG. 6, with continued reference to FIGS. 1, 3, 3A-3C, 4, 4A, and 5, a method 600 of operating the fragrance system 200 and dry particulate removal system 300 of the vehicle cleaning system 100 is illustrated, in accordance with an embodiment of the present disclosure. The method 600 may be performed by the controller 28.

At block 604, the method 600 is initiated. At block 606, passenger preferences 130 are loaded onto the controller 28 from the remote database 90. The passenger preferences 130 may include the passenger fragrance preferences 230 and the passenger particulate preferences 330. The passenger preferences 130 may be specific to a passenger that will be riding in the vehicle 10 next or the controller 28 may load all the passenger preferences 130 for passengers riding in the vehicle 10 that day.

At block 608, the controller 28 will check whether only a fragrance is required in response to the passenger preferences 130 and the cleanliness monitoring sensor 32. At block 608, if only a fragrance is required then the method 600 will move to block 628 to begin dispensing the fragrance using the fragrance system 200. At block 608, if more than a fragrance is required then the method 600 will move to block 610 to begin a dry particulate clean. Additionally, the controller 28 may check the connections of the vacuum system 310 and air jets 350. At block 610, the controller 28 may check that the vacuum inlet port 318 is connected to the vacuum pump 320, whether the outlet 472 is connected to the vacuum inlet port 318, and whether the air jets 350 are connected to the air pump 354. At block 612, if there is a problem with any connection of the vacuum system 310 and air jets 350 then the method 600 moves to block 614 to inform an operator/owner of the vehicle 10 that the method will end and the method 600 stops at block 616.

At block 612, if there are no system problems then the method 600 may perform any one or all of blocks 618, 620, 622, and 624 in any order or repetition. Blocks 618, 620, 622, and 624 may also occur simultaneously. At block 618, the air jets 350 may be activated and moved in a predefined pattern. At block 620, the vacuum pump 320 is activated. At block 622, the air jets 350 and at block 624, the agitation brushes 312 may be activated.

At block 628, the controller 28 checks the cleanliness monitoring sensor 32 and the passenger fragrance preferences 230 whether a selected fragrance 218 is required. At block 630 the controller activates the fragrance emitting device 216 to deliver a selected fragrance 218 into the passenger compartment 110. Then the method 600 moves to block 632 to inform an operator/owner of the vehicle 10 that the method 600 will end and the method stops at block 634.

While the above description has described the flow process of method 600 in a particular order, it should be appreciated that unless otherwise specifically required in the attached claims that the ordering of the steps may be varied.

Referring to FIG. 7, with continued reference to FIGS. 1-6, a method 700 of operating the wet particulate removal system 400 of the vehicle cleaning system 100 is illustrated, in accordance with an embodiment of the present disclosure. The method 700 may be performed by the controller 28.

At block 704, the method 700 is initiated. At block 706, passenger preferences 130 are loaded onto the controller 28 from the remote database 90. The passenger preferences may include the passenger wash preferences 430. The passenger preferences may be specific to a passenger that will be riding in the vehicle 10 next or the controller 28 may load all the passenger preferences 130 for passengers riding in the vehicle 10 that day.

At block 708, the controller 28 may check the connections of the vacuum system 310 and sprinkler system 410. The controller 28 may check that the vacuum inlet port 318 is connected with the (internal) vacuum pump 320, whether the outlet 472 is connected to the removal system 461, whether the inlet 424 is connected to the cleaning solution tank 460, and whether there are any faulty connections among the sprinklers 420 of the sprinkler system 410. At block 710, if there is a problem with any connections at block 780 then the method 700 moves to block 712 to inform an operator/owner of the vehicle 10 that the method 700 will end and the method stops at block 714.

At block 710, if there are no problems then the method 700 may perform any one or all of blocks 716, 718, 720, and 722 in any order or repetition. Blocks 716, 718, 720, and 722 may also occur simultaneously.

At block 716, the controller 28 ensures that the vents 214 of the HVAC system 210 are closed and the vacuum inlet port 318 is also closed. At block 718, the sprinkler system 410 sprays the cleaning solution 462 into the passenger compartment 110 through the sprinklers 420. At block 720, the vacuum inlet ports 318 are opened the vacuum system 310 is activated to remove cleaning solution and particulates. At block 722, the vents 214 of the HVAC system 210 are opened and the HVAC system 210 is activated to dry the passenger compartment 110. Additionally, windows and/or doors of the vehicle 10 may also be opened to aid in the drying process of the passenger compartment 110 at block 722.

At block 724, the controller 28 checks the passenger fragrance preferences 230 to determine whether a selected fragrance 218 is required. At block 726, the controller 28 checks the cleanliness monitoring sensor 32 and determines whether a selected fragrance 218 is required. At block 728, the controller 28 activates the fragrance emitting device 216 to deliver the selected fragrance 218 into the passenger compartment 110. Then the method 700 moves to block 730 to inform an operator/owner of the vehicle 10 that the method 700 will end and the method 700 stops at block 732.

While the above description has described the flow process of method 700 in a particular order, it should be appreciated that unless otherwise specifically required in the attached claims that the ordering of the steps may be varied.

As described above, embodiments can be in the form of processor-implemented processes and devices for practicing those processes. Embodiments can also be in the form of computer program code containing instructions embodied in tangible media, such as network cloud storage, SD cards, flash drives, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the embodiments. When implemented on a general-purpose microprocessor, the computer program code segments configure the microprocessor to create specific logic circuits.

The term "about" is intended to include the degree of variance associated with measurement of the particular quantity based upon the equipment available at the time of filing the application.

The terminology used herein is for the purpose of describing particular embodiments only and is not intended to be limiting of the present disclosure. As used herein, the singular forms "a" "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplar embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle cleaning system for cleaning a vehicle, the system including a controller comprising:
   a processor; and
   a memory comprising computer-executable instructions that, when executed by the processor, cause the processor to perform operations, the operations comprising:
      determining that a passenger compartment of the vehicle requires cleaning; and
      identifying a type of cleaning required; and
      activating at least one of a fragrance system, a dry particulate removal system, and a wet particulate removal system in response to the type of cleaning required;
   wherein the operations further comprise:
      autonomously driving the vehicle to a cleaning solution tank;
      fluidly connecting a sprinkler of the wet particulate removal system to the cleaning solution tank; autonomously driving the vehicle to a cleaning solution tank; and fluidly connecting a sprinkler of the wet particulate removal system to the cleaning solution tank 15.

2. The vehicle cleaning system of claim 1, wherein the operations further comprise:
   receiving a cleanliness report from a passenger device indicating that the passenger compartment of the vehicle requires cleaning.

3. The vehicle cleaning system of claim 1, wherein the operations further comprise:
   detecting a cleanliness of the interior of the vehicle using a vehicle cleanliness monitoring sensor, wherein the vehicle cleanliness monitoring sensor is configured to detect the cleanliness using at least one of odor detection and image recognition.

4. The vehicle cleaning system of claim 1, further comprising:
    activating the sprinkler to spray a cleaning solution from the cleaning solution tank into the passenger compartment when the wet particulate removal system is activated.

5. The vehicle cleaning system of claim 4, wherein the operations further comprise:
    prior to activating the sprinkler closing at least one of a vacuum inlet port and a vent for a heating, ventilation, and air conditioning system of the vehicle, the vacuum inlet port and vent being fluidly connected to the passenger compartment.

6. The vehicle cleaning system of claim 5, wherein the operations further comprise:
    opening the vacuum inlet port when the sprinkler has finished activating.

7. The vehicle cleaning system of claim 6, wherein the operations further comprise:
    activating a vacuum pump of the dry particulate removal system when the vacuum inlet port has opened, wherein the vacuum pump is configured to apply a suction to the vacuum inlet port to remove particulates and the cleaning solution from the passenger compartment.

8. The vehicle cleaning system of claim 5, wherein the operations further comprise:
    opening the vent for the heating, ventilation, and air conditioning system of the vehicle when the sprinkler has finished activating; and
    activating the air-conditioning system when the vent has opened.

9. The vehicle cleaning system of claim 5, wherein the operations further comprise:
    lowering a window of the vehicle when the sprinkler has finished activating.

10. The vehicle cleaning system of claim 1, wherein the operations further comprise:
    activating a fragrance emitting device to emit a selected fragrance into the passenger compartment when the fragrance system is activated.

11. The vehicle cleaning system of claim 5, wherein the operations further comprise:
    activating a fragrance emitting device to emit a selected fragrance into the passenger compartment when the sprinkler has finished activating.

12. The vehicle cleaning system of claim 1, wherein the operations further include:
    activating a vacuum pump of the dry particulate removal system when the dry particulate removal system is activated, the dry particulate system further comprising a vacuum inlet port fluidly connected to the passenger compartment, wherein the vacuum pump is configured to apply a suction to the vacuum inlet port to remove particulates from the passenger compartment.

13. The vehicle cleaning system of claim 1, wherein the operations further comprise:
    activating an agitation brush of the dry particulate removal system when the dry particulate removal system is activated, the agitation brush being configured to agitate a surface of the passenger compartment to remove particulates on the surface.

14. The vehicle cleaning system of claim 1, wherein the operations further comprise:
    activating an air jet of the dry particulate removal system when the dry particulate removal system is activated, the air jet being configured to direct a concentrated jet of air at various components within the passenger compartment.

15. A vehicle cleaning system for cleaning a vehicle, the system including a controller comprising:
    a processor; and
    a memory comprising computer-executable instructions that, when executed by the processor, cause the processor to perform operations, the operations comprising:
        determining that a passenger compartment of the vehicle requires cleaning; and
        identifying a type of cleaning required; and
    activating at least one of a fragrance system, a dry particulate removal system, and a wet particulate removal system in response to the type of cleaning required;
    wherein the operations further comprise:
        receiving a passenger preference from a passenger device or a remote database, indicating that the passenger desires the cleaning of the vehicle prior to the passenger entering the vehicle.

16. A vehicle cleaning system for cleaning a vehicle, the vehicle cleaning system comprising:
    a fragrance system configured to emit a selected fragrance into a passenger compartment of the vehicle;
    a dry particulate removal system configured to remove particulate from the passenger compartment;
    a wet particulate removal system configured to wash the passenger compartment; and
    a controller configured to activate at least one of the fragrance system, the dry particulate removal system, and the wet particulate removal system, the controller including:
        a processor; and
        a memory comprising computer-executable instructions that, when executed by the processor, cause the processor to perform operations, the operations comprising:
            determining that a passenger compartment of the vehicle requires cleaning; and
            identifying a type of cleaning required; and
            activating at least one of the fragrance system, the dry particulate removal system, and the wet particulate removal system in response to the type of cleaning required.

17. The vehicle cleaning system of claim 16, wherein the dry particulate removal system further comprises:
    an agitation brush configured to agitate a surface of the passenger compartment to remove particulates on the surface;
    a vacuum inlet port fluidly connect to the passenger compartment; and
    a vacuum pump fluidly connected to the vacuum inlet port, the vacuum pump being configured to apply a suction to the vacuum inlet port.

18. The vehicle cleaning system of claim 16, wherein the dry particulate removal system further comprises:
    an air jet configured to direct a concentrated jet of air at various components within the passenger compartment.

19. The vehicle cleaning system of claim 16, wherein the wet particulate removal system further comprises:
    a sprinkler configured to spray a cleaning solution into the passenger compartment.

20. The vehicle cleaning system of claim 15, wherein the operations further comprise:

detecting a cleanliness of the interior of the vehicle using a vehicle cleanliness monitoring sensor, wherein the vehicle cleanliness monitoring sensor is configured to detect the cleanliness using at least one of odor detection and image recognition.

* * * * *